United States Patent
Ragan, III

(10) Patent No.: US 12,056,725 B2
(45) Date of Patent: Aug. 6, 2024

(54) HUMAN GESTURE-BASED CUSTOMER REFERRAL SCORE

(71) Applicant: Raymond Kenneth Ragan, III, Coral Springs, FL (US)

(72) Inventor: Raymond Kenneth Ragan, III, Coral Springs, FL (US)

(*) Notice: Subject to any disclaimer, the term of this patent is extended or adjusted under 35 U.S.C. 154(b) by 238 days.

(21) Appl. No.: 17/725,916

(22) Filed: Apr. 21, 2022

(65) Prior Publication Data
US 2023/0342791 A1    Oct. 26, 2023

(51) Int. Cl.
G06Q 30/00       (2023.01)
G06Q 30/0201    (2023.01)
G06V 40/20       (2022.01)

(52) U.S. Cl.
CPC ......... *G06Q 30/0201* (2013.01); *G06V 40/28* (2022.01)

(58) Field of Classification Search
CPC ............................ G06Q 30/0201; G06V 40/28
See application file for complete search history.

(56) References Cited

U.S. PATENT DOCUMENTS

| | | | | |
|---|---|---|---|---|
| 2015/0294432 A1* | 10/2015 | Jones | ................... | G06Q 50/265 |
| | | | | 705/325 |
| 2019/0266538 A1* | 8/2019 | Balakrishnan | ... | G06Q 10/06393 |
| 2019/0272547 A1* | 9/2019 | Coman | .................. | G06N 5/046 |
| 2020/0167837 A1* | 5/2020 | Dominguez | ....... | G06Q 30/0281 |

OTHER PUBLICATIONS

Sen, Sougata, et al. "I4S: Capturing shopper's in-store interactions." Proceedings of the 2018 ACM International Symposium on Wearable Computers. 2018.*

* cited by examiner

*Primary Examiner* — Kathleen Palavecino

(57) ABSTRACT

Embodiments of the disclosure provide a method, apparatus, system and computer program product for human gesture-based customer referral score determination. In an embodiment of the disclosure, the method includes detecting a customer through a camera installed at a location of the business and prompting the customer in a display at the location of the business to provide a gesture indicating whether the customer had a good experience and thereby likely to be willing to refer the business to others. The method further includes identifying the gesture through the camera using computer vision algorithms and responsive to identifying the gesture, automatically determining a customer referral score for the customer.

18 Claims, 1 Drawing Sheet

HUMAN GESTURE-BASED CUSTOMER REFERRAL SCORE

BACKGROUND OF THE INVENTION

Field of the Invention

The present disclosure relates to computer vision applied to client satisfaction determination and more particularly to computer vision applied to customer referral score determination.

Description of the Related Art

Net Promoter® Score is a concept in product development and customer service based on the premise that the best thing you can do for your product is to have someone refer the product to someone else. The score is a metric that rates the likelihood that customer will refer the product or service to someone else. A high score is a good indicator of customer satisfaction as the customer is likely to recommend the product or service to others. Thus, Net Promoter® Score is a type of customer referral score.

Normally, surveys are sent to customers after the customer received their product or service. A customer referral score is then calculated based off of the customer's answer to the surveys. However, over time, people have become less likely to respond to surveys and are often unwilling to respond to follow-up messages to provide feedback in order to calculate the score. Therefore, it is becoming increasingly difficult to calculate a customer referral score despite the score being a good indicator of client satisfaction.

BRIEF SUMMARY OF THE INVENTION

Embodiments of the present disclosure address deficiencies of the art in respect to computer vision applied to customer referral score determination and provide a novel and non-obvious method, system, computer program product for human gesture-based customer referral score determination. In an embodiment of the disclosure, a method for human gesture-based customer referral score determination includes detecting a customer through a camera installed at a location of the business and prompting the customer in a display at the location of the business to provide a gesture indicating whether the customer had a good experience and thereby likely to be willing to refer the business to others. The method further includes identifying the gesture through the camera using computer vision algorithms and responsive to identifying the gesture, automatically determining a customer referral score for the customer.

In one aspect of the embodiment, the location of the business is an exit of the business. In another aspect of the embodiment, the location of the business is the point of service of the business. In yet another aspect of the embodiment, the customer is detected through computer vision algorithms. In another aspect of the embodiment, the gesture is selected from the group consisting of a thumbs-up, a thumbs-down and a non-gesture. In yet another aspect of the embodiment, the customer referral score for the customer is aggregated with previous customer referral scores to determine an overall customer referral score for the business in real-time or as close to real-time as possible.

In another embodiment of the disclosure, a data processing system may be configured for human gesture-based customer referral score determination. The system includes a host computing system including one or more computers each with memory and at least one processor, a display and a camera installed at a location of a business in communication with the host computing system, and an application executing in memory of the host computing system. A human gesture-based customer referral score module is coupled to the application and the module includes program code enabled to detect a customer through the camera installed at the exit or point of service to the business, prompt the customer in the display at the location of the business to provide a gesture indicating whether the customer is willing to refer the business to others, identify the gesture or non-gesture through the camera using computer vision algorithms, and respond to identifying the gesture by automatically determining a customer referral score for the customer.

Additional aspects of the disclosure will be set forth in part in the description which follows, and in part will be obvious from the description, or may be learned by practice of the disclosure. The aspects of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE SEVERAL VIEWS OF THE DRAWINGS

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein.

DETAILED DESCRIPTION OF THE INVENTION

Embodiments of the disclosure provide for human gesture-based customer referral score determination. A system including display device, such as a computer monitor, tablet, television, etc., and a camera are installed at the exit or point of service of a business, such as an office or a store. The exit may be any location of or within the business during the completion of the customer's transaction or after the customer completes their transaction. The point of service may be any location of or within the business near where the customer completes their transaction with the business. As a customer exits the business following the customer's visit to the business or completes their transaction at the point of service, the system detects that a person is exiting using the camera and computer vision algorithms. The system then prompts the customer in the display device to provide a gesture, such as a thumbs up or thumbs down, to indicate whether the customer had a good experience and is likely to recommend the business to others. The system then identifies whether the gesture provided by the customer is a thumbs-up, thumbs-down or non-gesture using the camera and computer vision algorithms. The system then determines a customer referral score for the customer. The customer referral score may be aggregated with other customer referral scores from other instances and other customers to determine an overall customer referral score for the business. The customer referral score for the customer and the overall customer referral score for the business may determined in real-time.

Figure 1:
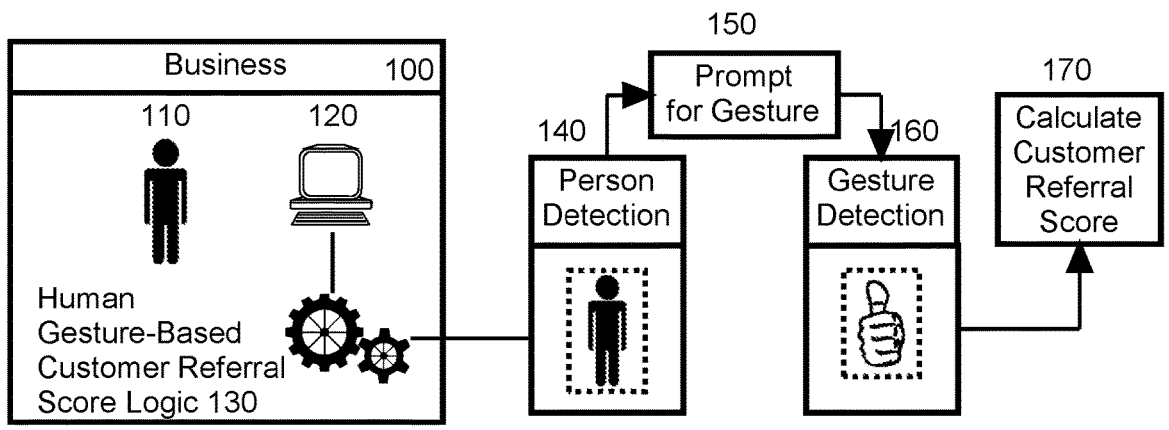
FIG. 1 is a pictorial illustration of a process for human gesture-based customer referral score determination according to an embodiment of the disclosure.

In further illustration, FIG. 1 pictorially shows a process for human gesture-based customer referral score determination according to an embodiment of the disclosure. As shown in FIG. 1, a customer or person 110 visits a business 100. The business 100 may be any business that offers any product or service. Computing system 120 includes a monitor and a camera installed at the exit or point of service to the business and human gesture-based customer referral score logic 130. As the customer 110 exits the business 100, logic 130 uses the camera of the system 120 installed at the exit or point of service and computer vision algorithms for person detection 140 to detect the customer 110. In response to detecting the customer exiting the business, logic 130 prompts the customer for a gesture 150 in the display of system 120. The prompt 150 in the display requests the customer provide a gesture, such as a thumbs up to indicate that the customer had a good experience and is likely to recommend the business to others, a thumbs down to indicate that the customer did not have a good experience and is not likely to recommend the business to others, or a non-gesture/no response to indicate that the customer is neutral or does not wish to respond. The prompt may include all of the gestures and non-gestures or only some of the gestures and non-gestures, such as just the thumbs-up and thumbs-down. Customer 110 then provides the gesture or non-gesture. Gesture detection 160 of logic 130 uses the camera of the system 120 installed at the exit or point of service and computer vision algorithms to determine whether the gesture provided by the customer is a thumbs-up, thumbs-down or non-gesture. Logic 130 then calculates customer referral score 170 for the customer based on the gesture or non-gesture. A non-gesture, which may be no response or any gesture other than a thumbs-up or a thumbs-down, counts the customer as part of the overall customer referral score calculation. The customer referral score of the customer may then be aggregated with previous customer referral score calculations based on previous gesture and non-gesture detections of customers and other surveys of customers to determine an overall customer referral score of the business. The scores may be automatically determined in real-time.

Figure 2:
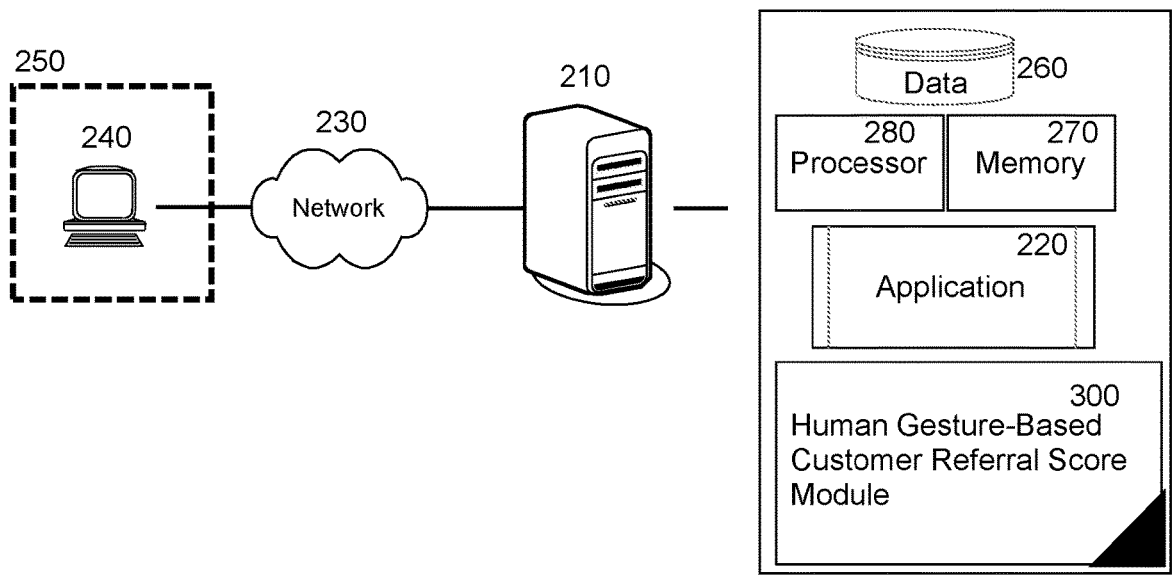
FIG. 2 is a schematic illustration of a data processing system adapted for human gesture-based customer referral score determination according to an embodiment of the disclosure; and, FIG. 3 is a flow chart illustrating a process for human gesture-based customer referral score determination according to an embodiment of the disclosure.

The process shown in FIG. 1 may be implemented in a computer data processing system. In further illustration, FIG. 2 schematically shows a data processing system adapted for human gesture-based customer referral score determination according to an embodiment of the disclosure. The system communicates over a network 230 with a server 210 and the system includes at least one processor 280 and memory 270 and fixed storage 260 disposed within the system. The system includes an application 220 with human gesture-based customer referral score module 300. The system includes computing device 240 with a display and a camera located at the exit or point of service of a business 250. Although only one computing devices 240 in one business 250 is shown, any amount computing devices in any amount of businesses or locations of a business are within the scope of the disclosure.

Human gesture-based customer referral score module 300 detects that a person is exiting using the camera of computing device 240 and computer vision algorithms. The module 300 then prompts the customer in the display of computing device 240 to provide a gesture, such as a thumbs up, thumbs down or non-gesture, to indicate whether the customer had a good experience and is likely to recommend the business to others. Module 300 then identifies whether the gesture provided by the customer is a thumbs-up, thumbs-down, or non-gesture using the camera of computing device 240 and computer vision algorithms. Module 300 then determines a customer referral score for the customer. Module 300 may also aggregate the customer referral score with other customer referral scores from other customers and other instances to determine an overall customer referral score for the business.

Figure 3:
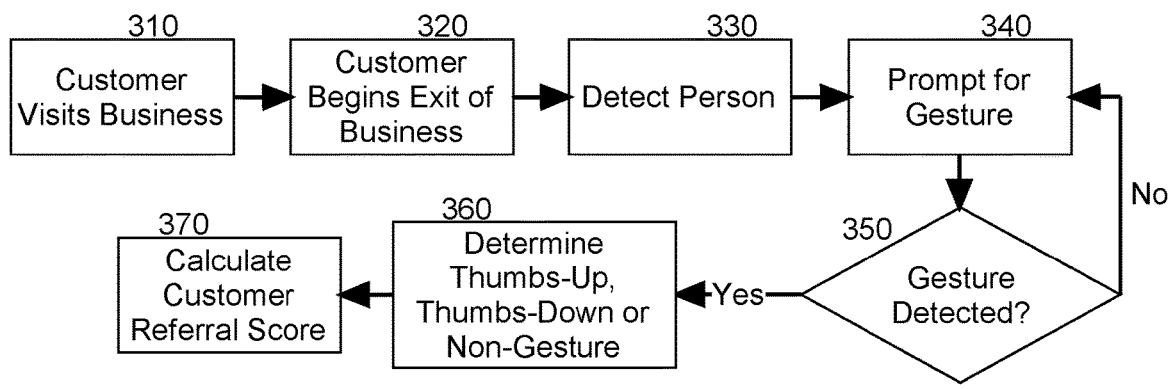

In even yet further illustration of the operation of the module 300, FIG. 3 is a flow chart illustrating an exemplary process for human gesture-based customer referral score determination according to an embodiment of the disclosure. Beginning in block 310, a customer visits a business, receives a product or service from the business, finishes their transaction with the business, and the customer begins to exit the business in block 320. In block 330, the customer is detected exiting the business using a camera installed near the exit or the point of service of the business using computer vision algorithms that detect a person. In block 340, a display prompts the customer to provide a gesture that may include a thumbs-up to indicate that the customer had a good experience and is likely willing to recommend the business to others, a thumbs-down to indicate that the customer did not have a good experience and is likely not willing to recommend the business to others, or a non-gesture to indicate that the customer is neutral or does not wish to respond. In block 350, the prompt remains until the gesture is detected or the customer leaves and a new customer is detected. In block 360, using the camera installed near the exit of the business and computer vision algorithms to detect thumbs-up and thumbs-down gestures or non-gestures, the gesture is determined to be a thumbs-up, thumbs-down or a non-gesture. Based on the detected gesture, in block 370, the customer referral score for the customer is calculated and the customer referral score of the customer may be aggregated with previous customer referral scores of other customers and other instances to determine an overall customer referral score of the business.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims as follows:

The invention claimed is:

1. A method for human gesture-based customer referral score determination comprising:
   detecting a customer through a camera installed at a location of the business;
   generating a prompt for a customer in a display at the location of the business to provide a response indicating whether the customer had a good experience and thereby likely to be willing to refer the business to others;
   detecting the response, through the camera using computer vison algorithms, wherein the response indicates whether the customer had a good experience;
   identifying the response through the camera using computer vision algorithms;
   responsive to identifying the response, automatically determining a customer referral score for the customer; and
   wherein, the response is either a gesture or a non-gesture and when a non-gesture is detected from the customer, using the non-gesture in determining a customer referral score.

2. The method of claim 1, wherein the location of the business is an exit of the business.

3. The method of claim 1, wherein the location of the business is a point of service of the business.

4. The method of claim 1, wherein the customer is detected through computer vision algorithms.

5. The method of claim 1, wherein the gesture is selected from the group consisting of a thumbs-up and a thumbs-down.

6. The method of claim 1, wherein the customer referral score for the customer is aggregated with previous customer referral scores to determine an overall customer referral score for the business in real-time.

7. A data processing system configured for human gesture-based customer referral score determination, the system comprising:
   a host computing system comprising one or more computers each with memory and at least one processor;
   a display and a camera installed at a location of a business in communication with the host computing system;
   an application executing in memory of the host computing system; and, a human gesture-based customer referral score module coupled to the application, the module comprising program code enabled to:
  detect a customer through the camera installed at the location of the business,
  generate a prompt for the customer in the display at the location of the business to provide a response indicating whether the customer had a good experience and thereby likely to be willing to refer the business to others, identify the response through the camera using computer vision algorithms,
  detect, through the camera using computer vison algorithms, the response indicating whether the customer had a good experience;
  respond to identifying the response by automatically determining a customer referral score for the customer; and
  wherein the response is either a gesture or a non-gesture and when a non-gesture is detected from the customer, use the non-gesture in determining a customer referral score.

8. The system of claim 7, wherein the location of the business is an exit of the business.

9. The system of claim 7, wherein the location of the business is a point of service of the business.

10. The system of claim 7, wherein the customer is detected through computer vision algorithms.

11. The system of claim 7, wherein the gesture is selected from the group consisting of a thumbs-up and a thumbs-down.

12. The system of claim 7, wherein the customer referral score for the customer is aggregated with previous customer referral scores to determine an overall customer referral score for the business in real-time.

13. A computer program product for human gesture-based customer referral score determination, the computer program product comprising a non-transitory computer readable storage medium having program instructions embodied therewith, the program instructions executable by a device to cause the device to perform a method comprising:
  detecting a customer through a camera installed at a location of the business;
  generating a prompt for the customer in a display at the location of the business to provide a response indicating whether the customer had a good experience and thereby likely to be willing to refer the business to others;
  detecting, through the camera using computer vison algorithms, the response indicating whether the customer had a good experience;
  identifying the response through the camera using computer vision algorithms;
  responsive to identifying the response, automatically determining a customer referral score for the customer; and
  wherein, the response is either a gesture or a non-gesture and when a non-gesture is detected from the customer, using the non-gesture in determining a customer referral score.

14. The computer program product of claim 13, wherein the location of the business is an exit of the business.

15. The computer program product of claim 13, wherein the location of the business is a point of service of the business.

16. The computer program product of claim 13, wherein the customer is detected through computer vision algorithms.

17. The computer program product of claim 13, wherein the gesture is selected from the group consisting of a thumbs-up and a thumbs-down.

18. The computer program product of claim 13, wherein the customer referral score for the customer is aggregated with previous customer referral scores to determine an overall customer referral score for the business in real-time.

* * * * *